(12) United States Patent
Jan et al.

(10) Patent No.: US 7,673,893 B2
(45) Date of Patent: Mar. 9, 2010

(54) SPRING-BASED MECHANISM FOR SAVING LABOR OF A BICYCLE RIDER

(75) Inventors: Fu-She Jan, Changhua (TW); Po Chou, Changhua (TW)

(73) Assignee: Chienkuo Technology University, Changhua (TW)

( * ) Notice: Subject to any disclaimer, the term of this patent is extended or adjusted under 35 U.S.C. 154(b) by 146 days.

(21) Appl. No.: 11/874,238

(22) Filed: Oct. 18, 2007

(65) Prior Publication Data

US 2009/0102156 A1 Apr. 23, 2009

(51) Int. Cl.
*B62M 1/10* (2006.01)
*F03G 1/00* (2006.01)

(52) U.S. Cl. .................. 280/215; 280/212; 280/214; 280/260; 185/37; 185/38; 185/40 H (58) Field of Classification Search .............. 280/215, 280/212, 214, 260; 185/37, 38, 40 H
See application file for complete search history.

(56) References Cited

U.S. PATENT DOCUMENTS

| | | | | |
|---|---|---|---|---|
| 2,965,393 A | * | 12/1960 | Cauchon | 280/212 |
| 4,416,464 A | * | 11/1983 | Mattox | 280/215 |
| 4,447,068 A | * | 5/1984 | Brooks | 280/260 |
| 4,744,577 A | * | 5/1988 | Brent et al. | 280/215 |
| 5,301,571 A | * | 4/1994 | Arrivabene | 74/594.3 |
| 5,873,590 A | * | 2/1999 | Abe et al. | 280/259 |
| 6,053,830 A | * | 4/2000 | Glaeser | 474/101 |
| 6,557,877 B2 | * | 5/2003 | Dunkley | 280/215 |

\* cited by examiner

*Primary Examiner*—Lesley D Morris
*Assistant Examiner*—Marlon A Arce
(74) *Attorney, Agent, or Firm*—Alan Kamrath; Kamrath & Associates PA (57) ABSTRACT

A spring-based mechanism for saving labor of a bicycle rider is disclosed and in one embodiment includes an axle operatively connected to a chain wheel and a first set of bearings via a gear assembly; a housing for mounting a shaft therein wherein the first set of bearings is provided at one end of the shaft; a second set of bearings provided at the other end of the shaft; a spring in the housing and having one end attached to one end of the shaft and the other end attached to the other end of the housing; and a clutch provided externally of the other end of the housing, the clutch being operatively connected to the second set of bearings and including a lock lever. The mechanism can store elastic force by counterclockwise pedaling and release the stored energy by disengaging a clutch from the mechanism when riding uphill.

5 Claims, 9 Drawing Sheets

SPRING-BASED MECHANISM FOR SAVING LABOR OF A BICYCLE RIDER

BACKGROUND OF THE INVENTION

1. Field of Invention

The invention relates to labor saving mechanisms and more particularly to a bicycle having a spring-based mechanism operatively connected to an axle of a chain wheel of a bicycle, the mechanism being adapted to store elastic force by counterclockwise pedaling and adapted to release the stored energy by disengaging a clutch from the mechanism when, for example, riding uphill.

2. Description of Related Art

Conventionally, a bicycle is propelled by foot pedals. A rider has to exert a great force to pedal the bicycle when riding uphill, against the wind, or the like. Thus, the rider tends to experience fatigue when riding in such condition.

For reducing fatigue of the bicycle rider, a derailleur is mounted on a bicycle. However, labor saved by the derailleur is limited. It is often that a rider may subject to fatigue when riding uphill even by riding a derailleur equipped bicycle. Thus, the need for improvement still exists.

SUMMARY OF THE INVENTION

It is therefore one object of the invention to provide a spring-based mechanism for saving labor of a bicycle rider. The mechanism is operatively connected to an axle of a chain wheel of a bicycle, the mechanism being adapted to store elastic force by counterclockwise pedaling and adapted to release the stored energy by disengaging a clutch from the mechanism when, for example, riding uphill.

In one aspect of the invention there is provided a mechanism for use with a manually propelled vehicle, comprising an axle operatively connected to a chain wheel of the vehicle and operatively connected to a first set of bearings via a transmission assembly; a housing for mounting a shaft therein wherein the first set of bearings is provided at one end of the shaft; a second set of bearings provided at the other end of the shaft; a spring provided in the housing and having one end attached to one end of the shaft and the other end attached to the other end of the housing; and a clutch provided externally of the other end of the housing distal the axle, the clutch being operatively connected to the second set of bearings and including a lock lever.

In another aspect of the invention there is provided a mechanism for use with a bicycle having a first gear mounted on an axle of a chain wheel, the mechanism being disposed externally of the bicycle and comprising a housing for mounting a shaft therein; a second gear operatively connected to the shaft; a first set of bearings provided at one end of the shaft; a second set of bearings provided at the other end of the shaft; a spring provided in the housing and having one end attached to one end of the shaft and the other end attached to the other end of the housing; a third gear in mesh with the second gear; a clutch operatively connected to the third gear; and a fourth gear operatively connected to the clutch and being in mesh with the first gear.

In a further aspect of the invention there is provided a mechanism for use with a bicycle, comprising an axle operatively connected to a chain wheel of the bicycle and operatively connected to a first set of bearings via a first transmission assembly; a housing for mounting a first shaft therein wherein the first set of bearings is provided at one end of the first shaft; a second set of bearings provided at the other end of the first shaft; a spring provided in the housing and having one end attached to one end of the first shaft and the other end attached to the other end of the housing; a second shaft operatively connected to the first transmission assembly opposing the axle; a first clutch provided externally of the other end of the housing distal the axle, the clutch being operatively connected to the second set of bearings and including a lock lever; a second clutch operatively connected to the second shaft; and a second transmission assembly operatively interconnecting the second clutch and a rear wheel of the bicycle.

The above and other objects, features and advantages of the invention will become apparent from the following detailed description taken with the accompanying drawings.

DETAILED DESCRIPTION OF THE INVENTION

Referring to FIGS. 1 to 5, a spring-based mechanism 61 of a first preferred embodiment of the invention mounted on a bicycle is shown. The mechanism 61 comprises the following components.

An axle 10 is operatively connected to an axle of a chain wheel of a bicycle. The axle 10 is also operatively connected to a first set of bearings 41 via a transmission assembly 11.

A housing 20 is adapted to house a spring (e.g., torsion spring) 30 and a shaft 40. The first set of bearings 41 is provided at one end of the shaft 40 and a second set of bearings 42 is provided at the other end thereof. The spring 30 has one end 32 attached to one end of the shaft 40 and the other end 31 attached to the other end of the housing 20.

A clutch 50 is provided externally of the other end of the housing 20 distal the axle 10. The clutch 50 is operatively connected to the second set of bearings 42. The clutch 50 comprises a lock lever 51 as a manipulation means.

The transmission assembly 11 is comprised of a first gear (e.g., bevel gear) 12 and a second gear (e.g., bevel gear) 13 in mesh with the first gear 12. The mechanism 61 is provided in a down tube 61 or besides the down tube 61. The shaft 40 and the second gear 13 are disposed in a bottom bracket 62.

Figure 1:
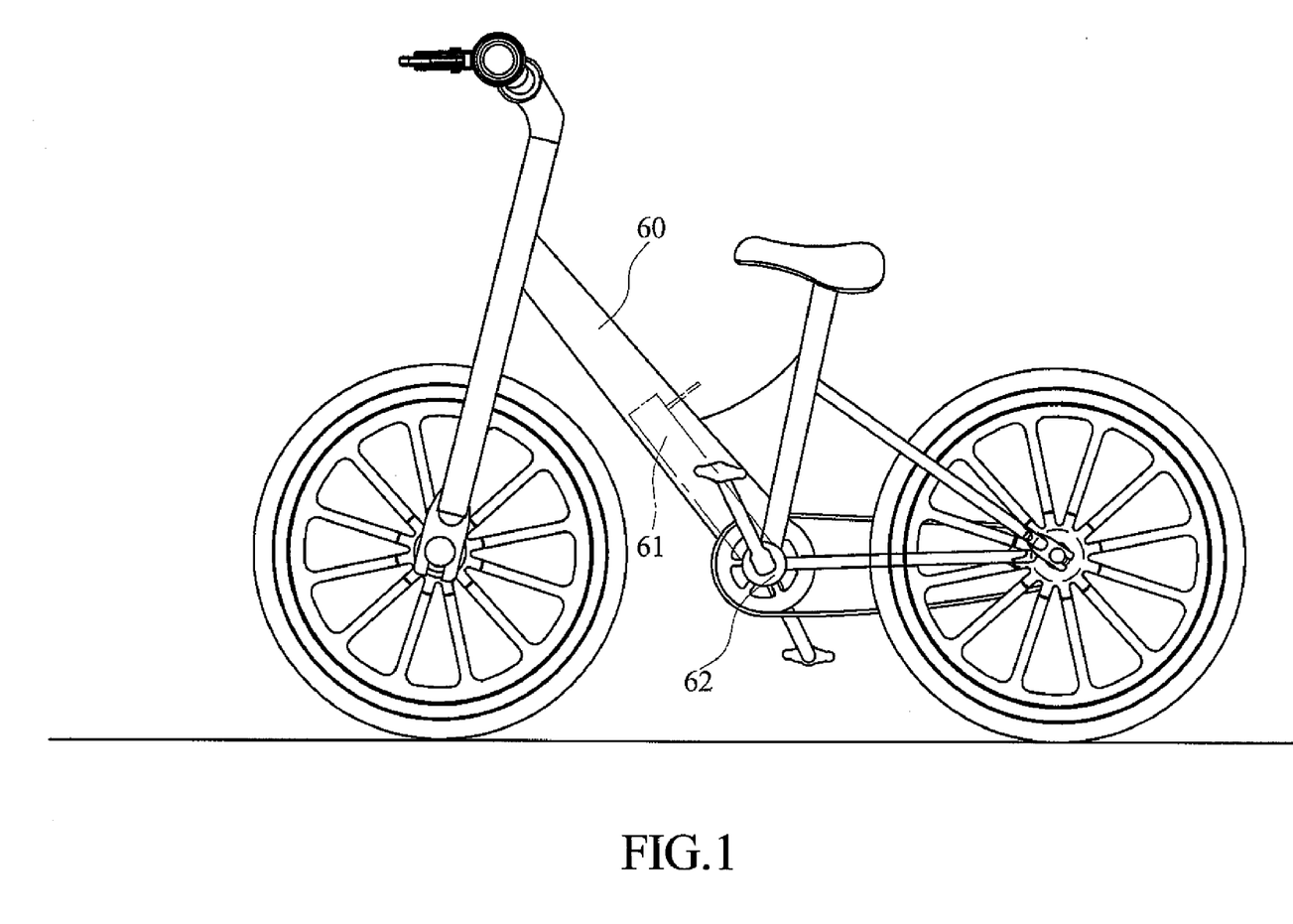
FIG. 1 is a side elevation of a bicycle incorporating a first preferred embodiment of spring-based mechanism according to the invention.
Figure 2:
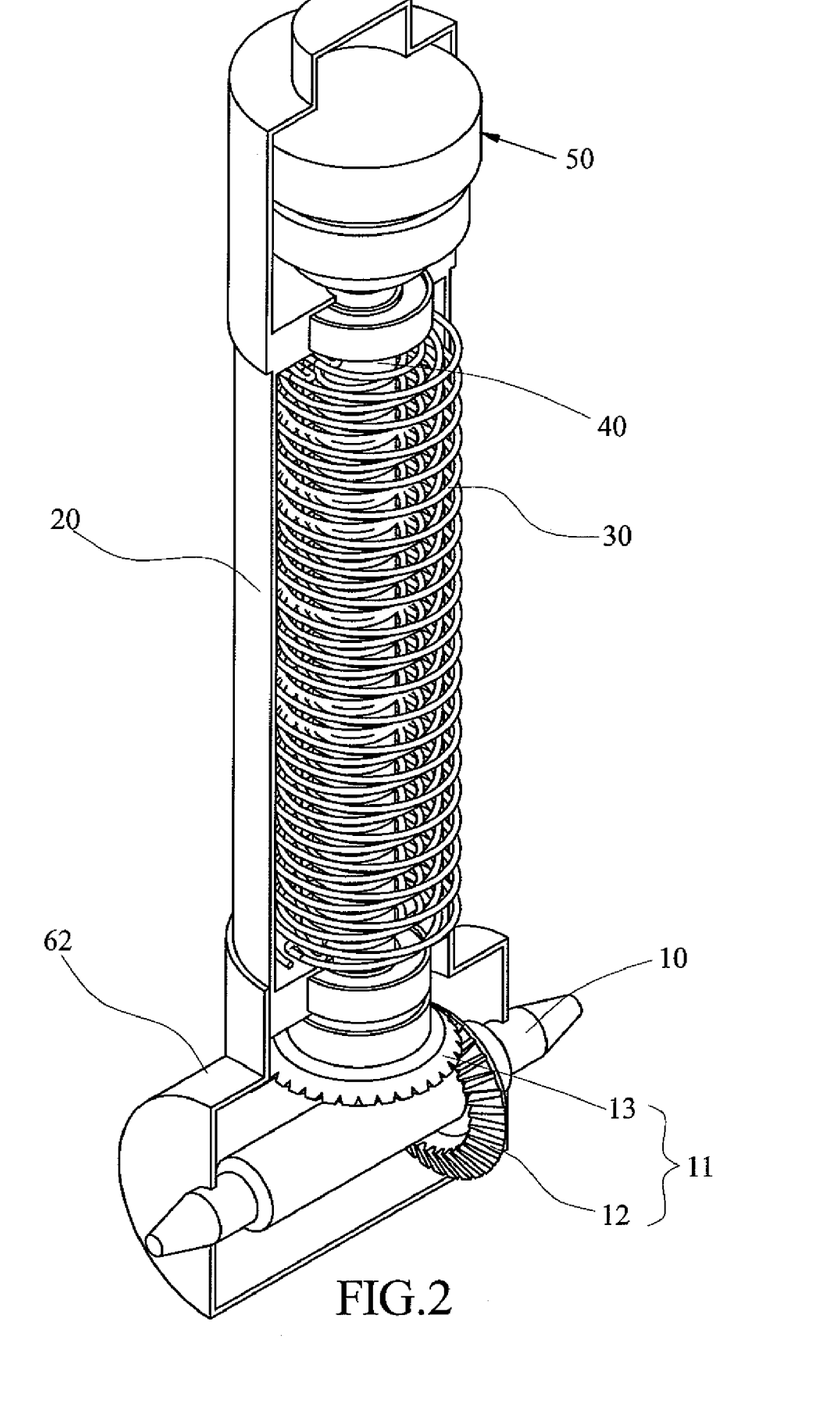
FIG. 2 is a broken-away perspective view of the mechanism.
Figure 3:
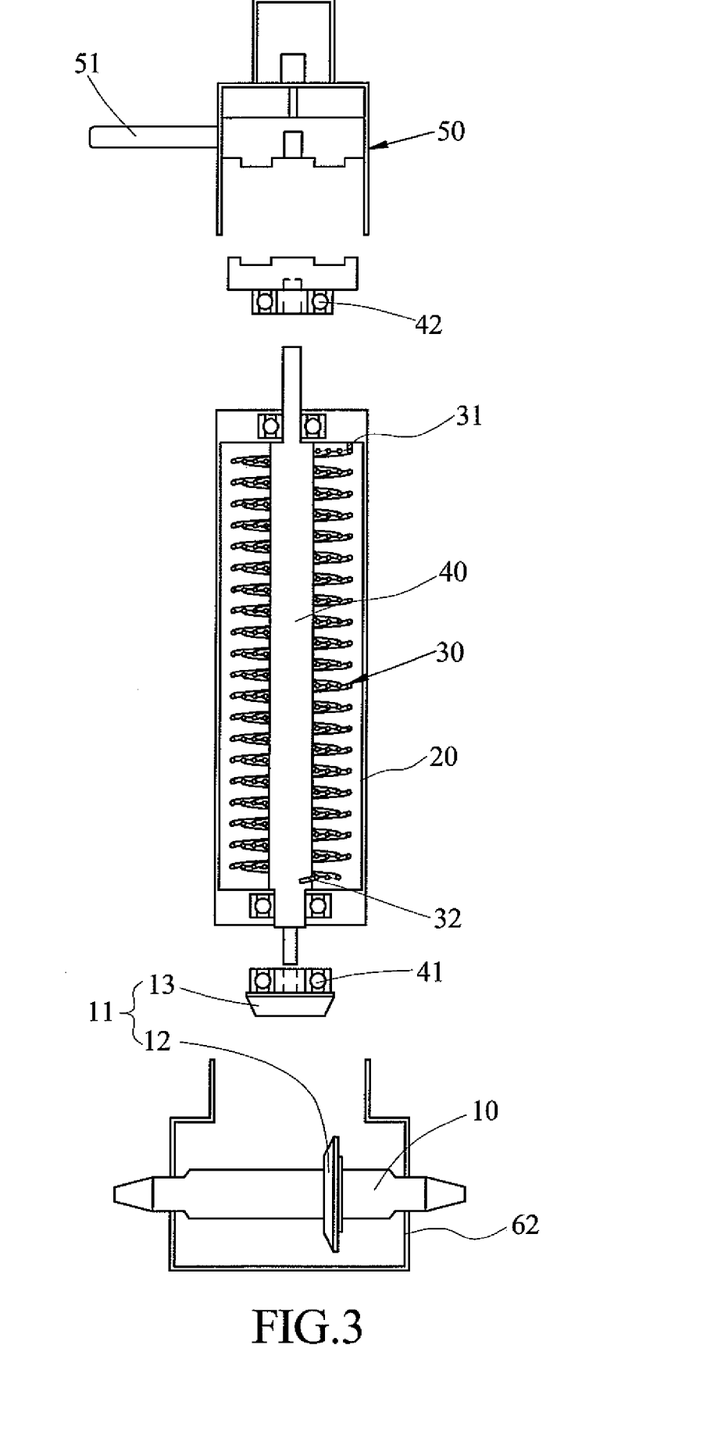
FIG. 3 is a side elevation of the exploded mechanism.
Figure 4:
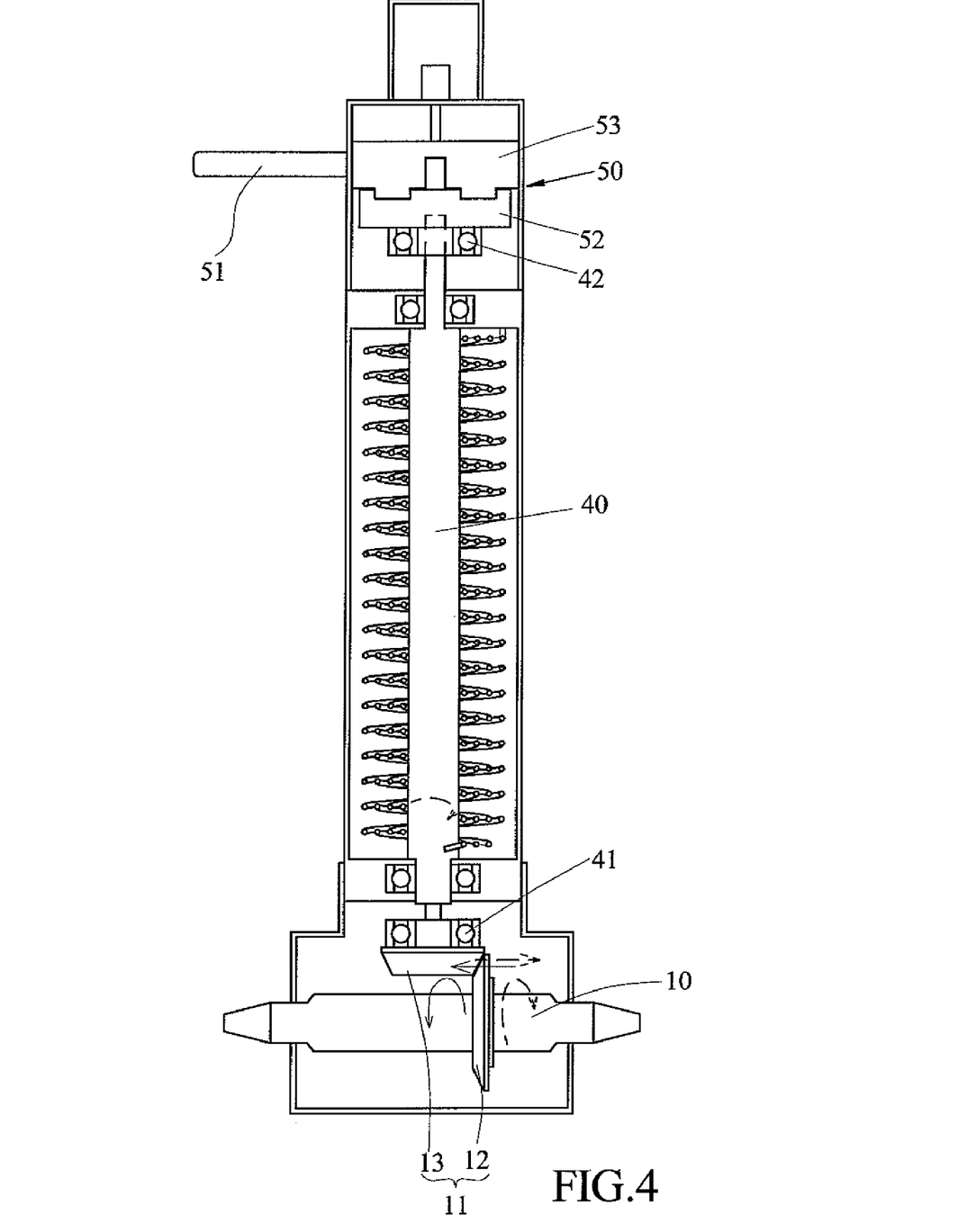
FIG. 4 is a side elevation of the assembled mechanism of FIG. 3 showing an elastic force storage of the mechanism by counterclockwise pedaling.

As shown in FIG. 4, a rider may pedal to turn the axle 10 and thus the first gear 12. Also, the second gear 13 turns the same direction as the first gear 12. But the first set of bearings 41 remains motionless. Hence, the shaft 40 does not rotate.

To the contrary, the rider may pedal counterclockwise turn the axle 10 and thus the first gear 12. Also, the second gear 13 turns the same direction as the first gear 12. The first set of bearings 41 also turns counterclockwise. Hence, the shaft 40 rotates. But the second set of bearings 42 remains motionless. Hence, a first engagement member 52 of the clutch 50 remains motionless and also remains the state of being engaged with a second engagement member 53 of the clutch 50. As a result, the shaft 40 continuously rotates to turn the spring 30 for storing elastic force.

Figure 5:
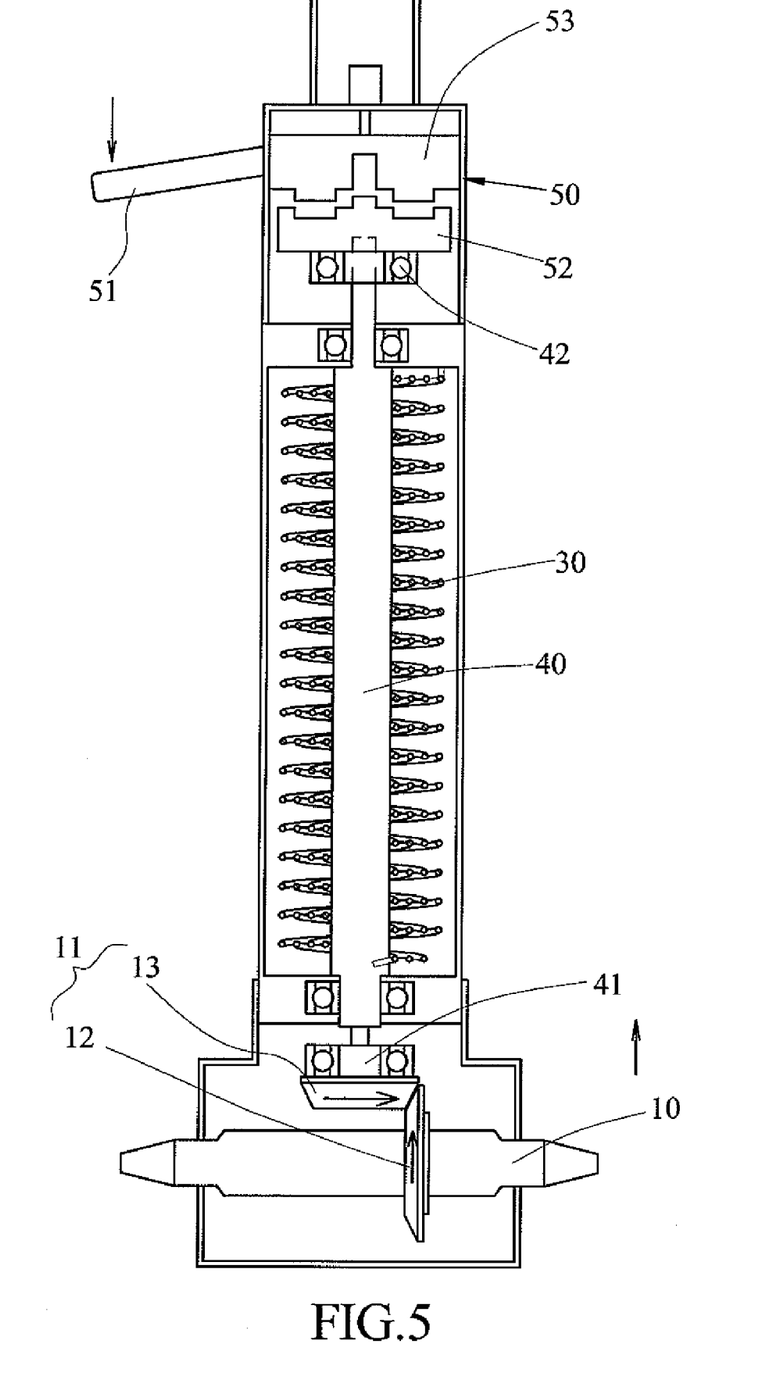
FIG. 5 is a view similar to FIG. 4 showing an energy release of the mechanism by disengaging a clutch therefrom when, for example, riding uphill.

As shown in FIG. 5, in response to riding, for example, uphill the rider may press the lock lever 51 to disengage the first engagement member 52 from the second engagement member 53. The stored energy of the spring 30 immediately releases to turn the shaft 40. And in turn, the second gear 13 turns clockwise via the first set of bearings 41. Also, both the first gear 12 and the axle 10 turn clockwise. As a result, the force exerted by the rider for propelling the bicycle of the invention is much less than that exerted on a conventional bicycle due to the energy release of the mechanism. This has the benefit of reducing fatigue of the rider.

Figure 6:
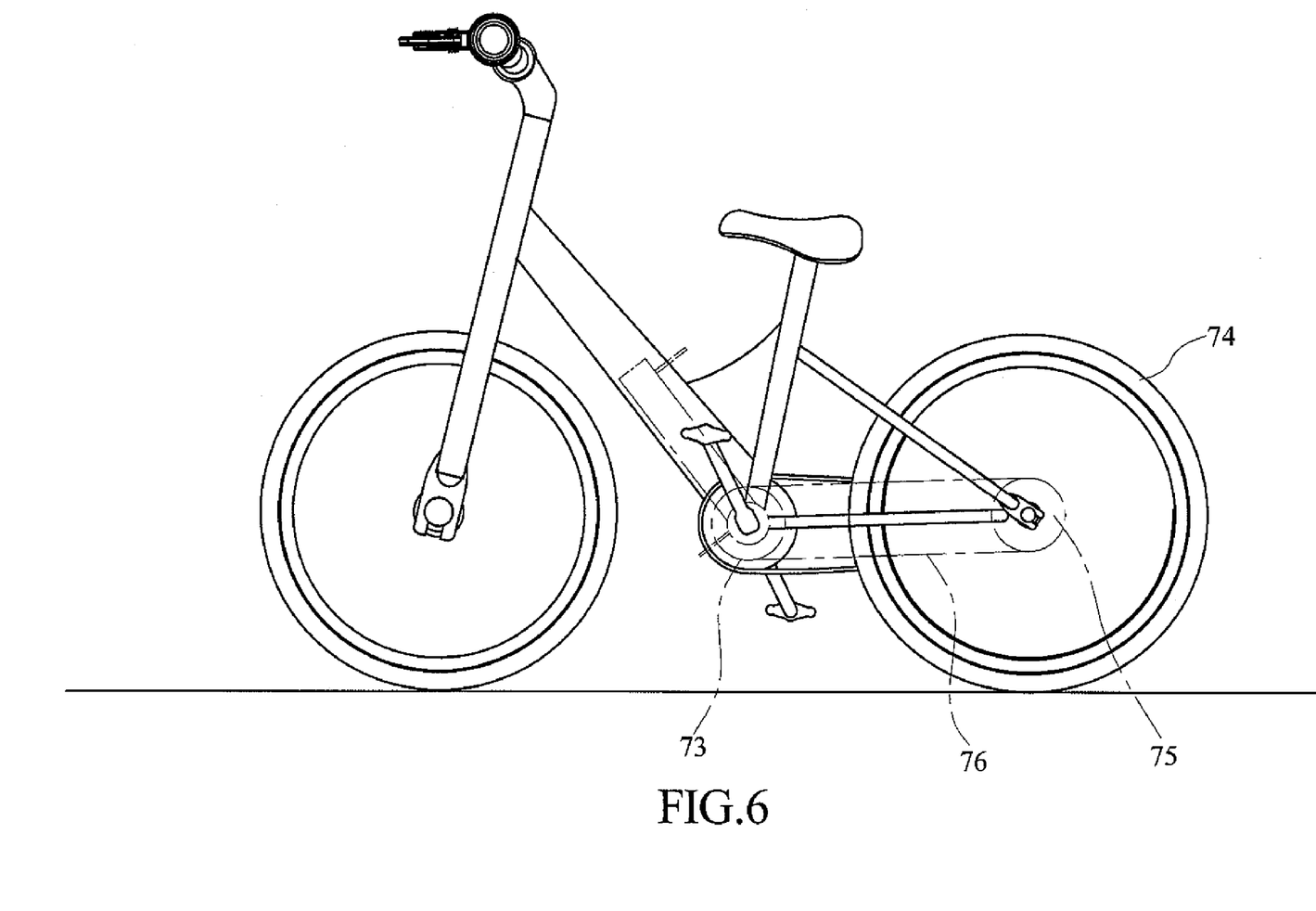
FIG. 6 is a side elevation of a bicycle incorporating a second preferred embodiment of spring-based mechanism according to the invention.
Figure 7:
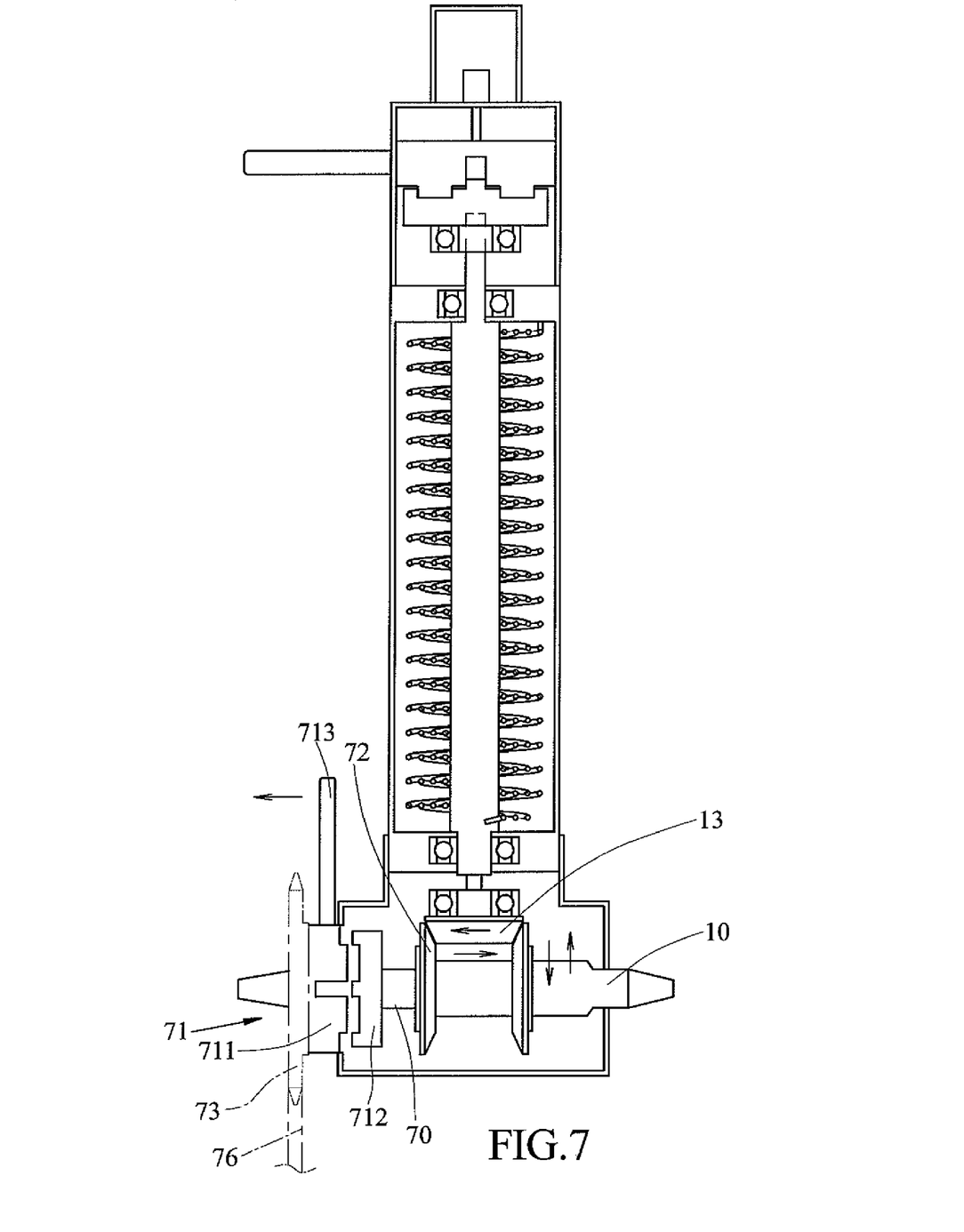
FIG. 7 is a side elevation of the broken-away mechanism of FIG. 6 showing an energy release of the mechanism by disengaging a clutch therefrom when, for example, riding uphill.
Figure 8:
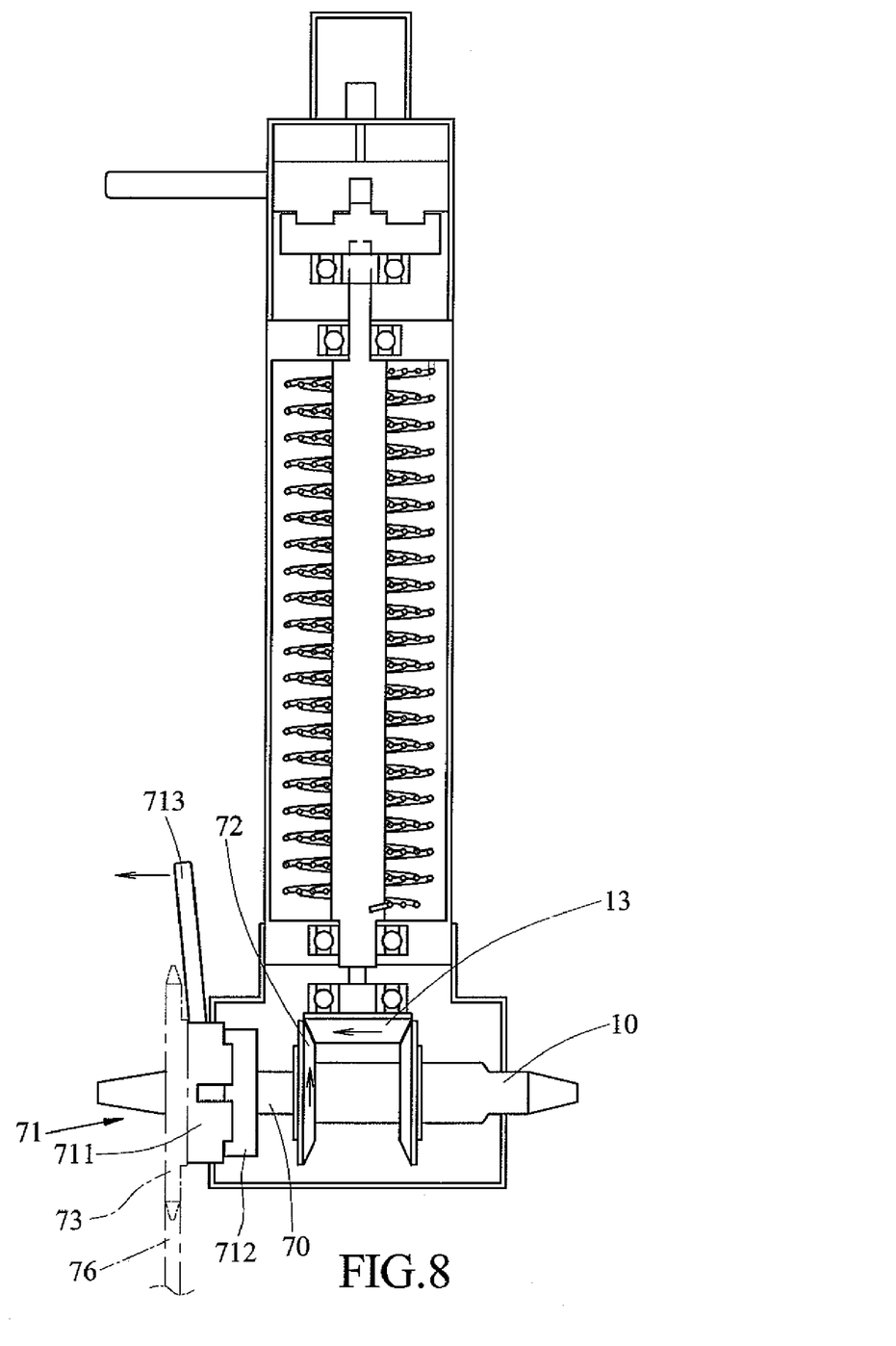
FIG. 8 is a view similar to FIG. 7 showing an elastic force storage of the mechanism when, for example, riding downhill.

Referring to FIGS. 6 to 8, a spring-based mechanism of a second preferred embodiment of the invention mounted on a bicycle is shown. The characteristics of the second preferred embodiment are detailed below. A third gear 72 is in mesh with the second gear 13 but opposite the first gear. A short second shaft 70 is provided at the other end of the axle 10 and extends outwardly from the third gear 72. A second clutch 71 is provided at the other end of the second shaft 70 and comprises a fourth engagement member 712 at the other end of the second shaft 70, a third engagement member 711 facing the first engagement member 712, and a second lock lever 713 as a manipulation means. A front sprocket wheel 73 is rotatably connected to the third engagement member 711 opposite the fourth engagement member 712. A rear sprocket wheel 75 is rotatably connected to an axle of a rear wheel 74 via a chain 76.

In response to riding, for example, downhill, the rider may manipulate the second lock lever 713 to engage the third engagement member 711 with the fourth engagement member 712. Thus, the rotational energy of the rear wheel 74 may transmit to the second gear 13 via the third gear 72. As a result, the shaft continuously rotates to turn the spring for storing elastic force (see FIG. 8).

To the contrary, the rider may manipulate the second lock lever 713 to disengage the third engagement member 711 from the fourth engagement member 712. As such, the stored energy of the spring immediately releases (see FIG. 7).

Note that the front sprocket wheel 73, the rear sprocket wheel 75, and the chain 76 can be replaced with two pulleys and a rope (or chain) run through the rims of both pulleys in other embodiments.

Figure 9:
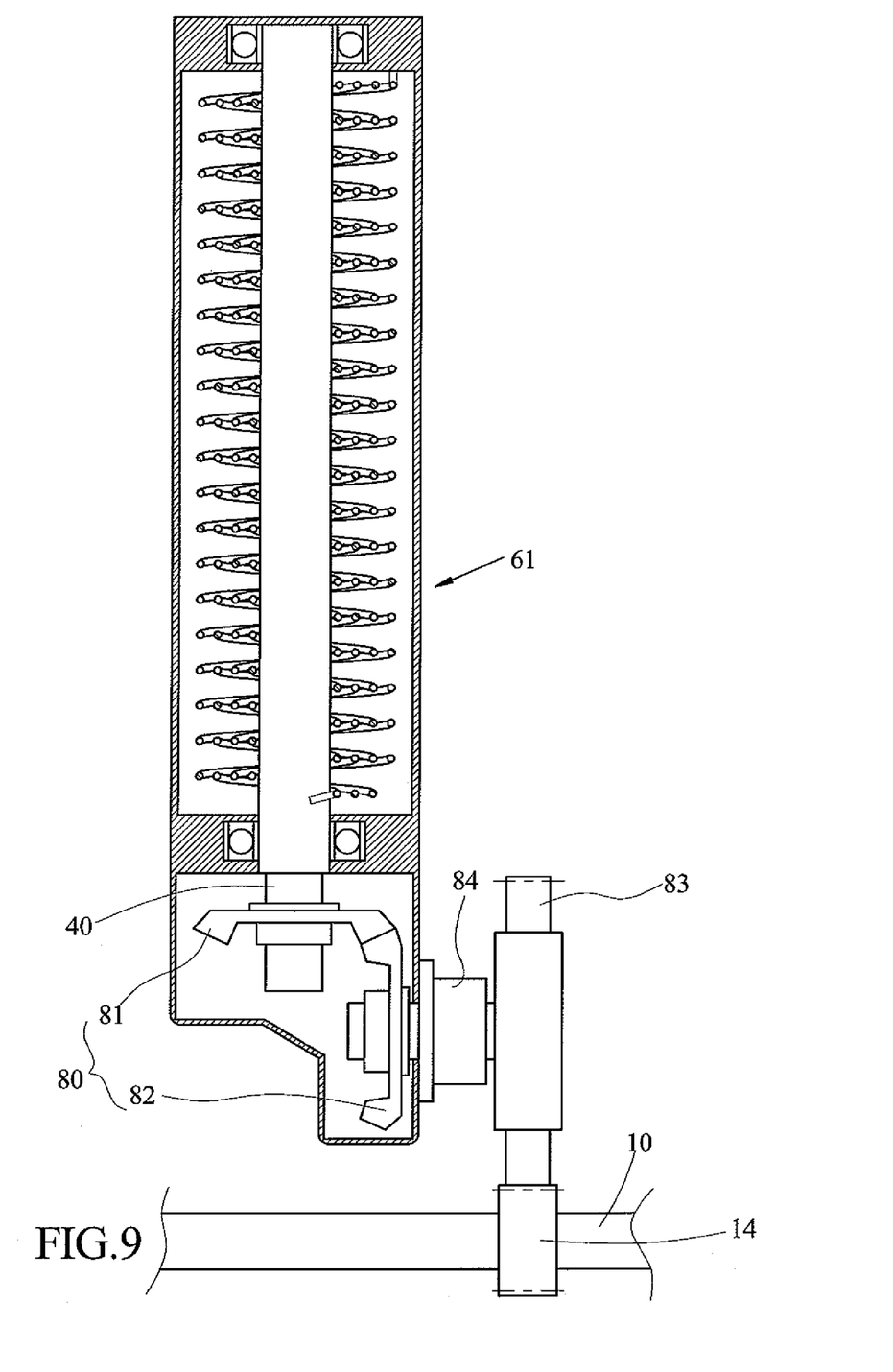
FIG. 9 is a side elevation, partially broken away view of a third preferred embodiment of spring-based mechanism according to the invention mounted on a bicycle.

Referring to FIG. 9, a spring-based mechanism 61 of a third preferred embodiment of the invention mounted on a bicycle is shown. The characteristics of the third preferred embodiment are detailed below. The mechanism 61 is provided externally of an axle of a chain wheel of a bicycle. A third gear 14 is mounted on an axle 10. A shaft 40 is operatively connected to a transmission assembly 80 which comprises a first gear (e.g., bevel gear) 81 and a second gear (e.g., bevel gear) 82 in mesh with the first gear 81. The second gear 82 is in turn operatively connected to a clutch 84. The clutch 84 is also operatively connected to a fourth gear 83 which is in mesh with the third gear 14.

The spring-based mechanism 61 of the invention can be applied to other manually propelled vehicle such as wheel chairs, carts or the like.

While the invention herein disclosed has been described by means of specific embodiments, numerous modifications and variations could be made thereto by those skilled in the art without departing from the scope and spirit of the invention set forth in the claims.

What is claimed is:

1. A mechanism for use with a manually propelled vehicle, comprising:
   an axle operatively connected to a chain wheel of the vehicle and operatively connected to a first set of bearings via a transmission assembly;
   a housing for mounting a shaft therein wherein the first set of bearings is disposed at one end of the shaft;
   a second set of bearings disposed at the other end of the shaft;
   a spring disposed in the housing and having one end attached to one end of the shaft and the other end attached to the other end of the housing; and
   a clutch disposed externally of the other end of the housing distal the axle, the clutch being operatively connected to the second set of bearings and including a lock lever.

2. The mechanism of claim 1, wherein the vehicle is a bicycle, a wheel chair, or a cart.

3. The mechanism of claim 1, wherein the spring is a torsion spring.

4. The mechanism of claim 2, wherein the mechanism is disposed in a down tube of the bicycle, the shaft is disposed in a bottom bracket of the bicycle, and the transmission assembly comprises a first bevel gear in the bottom bracket, and a second bevel gear in the bottom bracket, the second bevel gear being in mesh with the first bevel gear and being operatively connected to the first set of bearings.

5. The mechanism of claim 2, wherein the mechanism is disposed besides a down tube of the bicycle, the shaft is disposed in a bottom bracket of the bicycle, and the transmission assembly comprises a first bevel gear in the bottom bracket, and a second bevel gear in the bottom bracket, the second bevel gear being in mesh with the first bevel gear and being operatively connected to the first set of bearings.

\* \* \* \* \*